(12) United States Patent
Brosius

(10) Patent No.: US 7,697,160 B1
(45) Date of Patent: Apr. 13, 2010

(54) RESOLUTION AND DEVICE INDEPENDENT PLAIN-PAPER INPUT SYSTEM

(76) Inventor: Mark Gordon Brosius, 26394 Palmn Tree La., Murrieta, CA (US) 92563

( * ) Notice: Subject to any disclaimer, the term of this patent is extended or adjusted under 35 U.S.C. 154(b) by 1085 days.

(21) Appl. No.: 11/257,170

(22) Filed: Oct. 24, 2005

Related U.S. Application Data

(60) Provisional application No. 60/622,815, filed on Oct. 28, 2004.

(51) Int. Cl.
  *G06F 15/00* (2006.01)
  *G06K 9/00* (2006.01)
(52) U.S. Cl. .................................. 358/1.2; 382/181
(58) Field of Classification Search ............... 358/1.12, 358/1.13, 1.4, 1.9, 1.14, 1.18, 3.29, 1.16, 358/508, 3.28, 1.2; 382/181, 182, 305, 100, 382/190, 124; 707/3, 5, 6, 100, 104.1, 200; 705/31; 709/217, 224; 715/255, 273, 238, 715/209
See application file for complete search history.

(56) References Cited

U.S. PATENT DOCUMENTS

2005/0255439 A1* 11/2005 Cody .......................... 434/353

* cited by examiner

*Primary Examiner*—Saeid Ebrahimi Dehkordy

(57) ABSTRACT

The Resolution and Device Independent Plain-Paper Input System allows for quick and easy creation of hard-copy data input packages without the use of special forms or complex and costly special forms scanning machines. Input pages may be created on any personal computer and printed using any laser or inkjet type printer or copy machine. Personalized data may easily be encoded onto the forms at the time of printing. Additionally, forms may be output directly to formatted disk files such as adobe acrobat for viewing before printing. Completed forms may be scanned and the data read using a large variety of scanning devices such as high-speed digital copy machines, personal computer page scanners and fax machines.

7 Claims, 7 Drawing Sheets

Input Sheet Printing

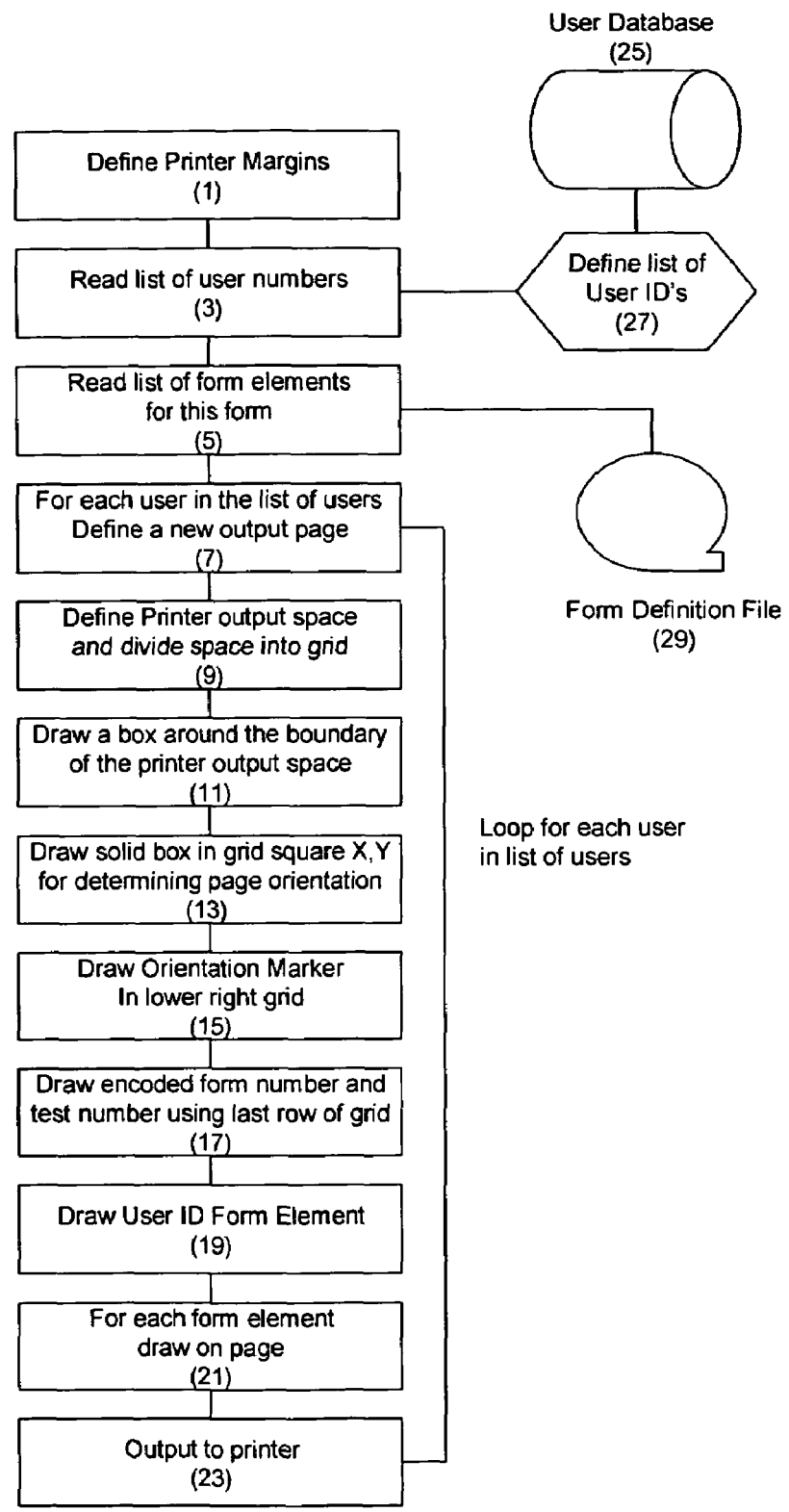
FIG.1 - Input Sheet Printing

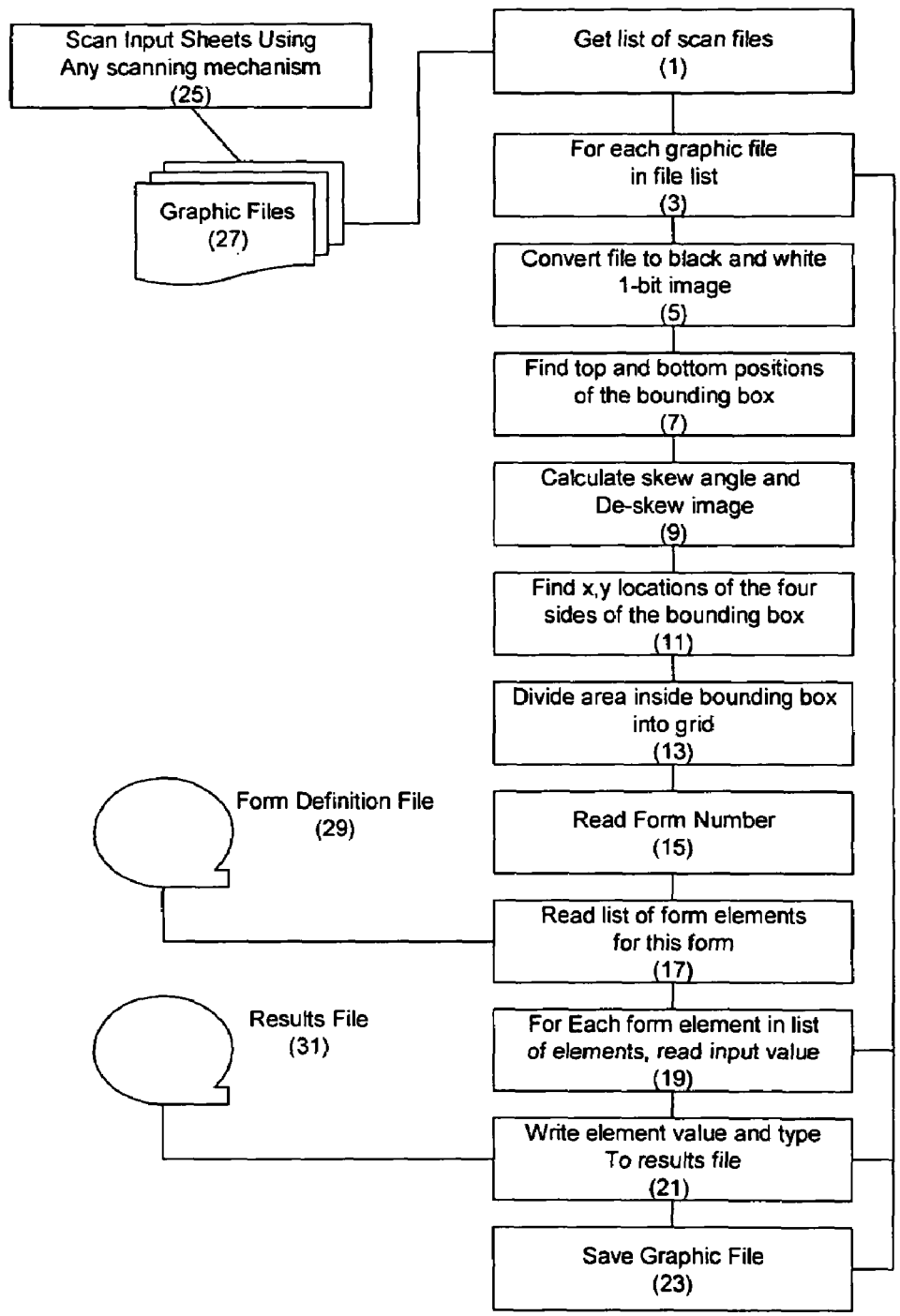
Fig.2 - Input Sheet Response Analysis

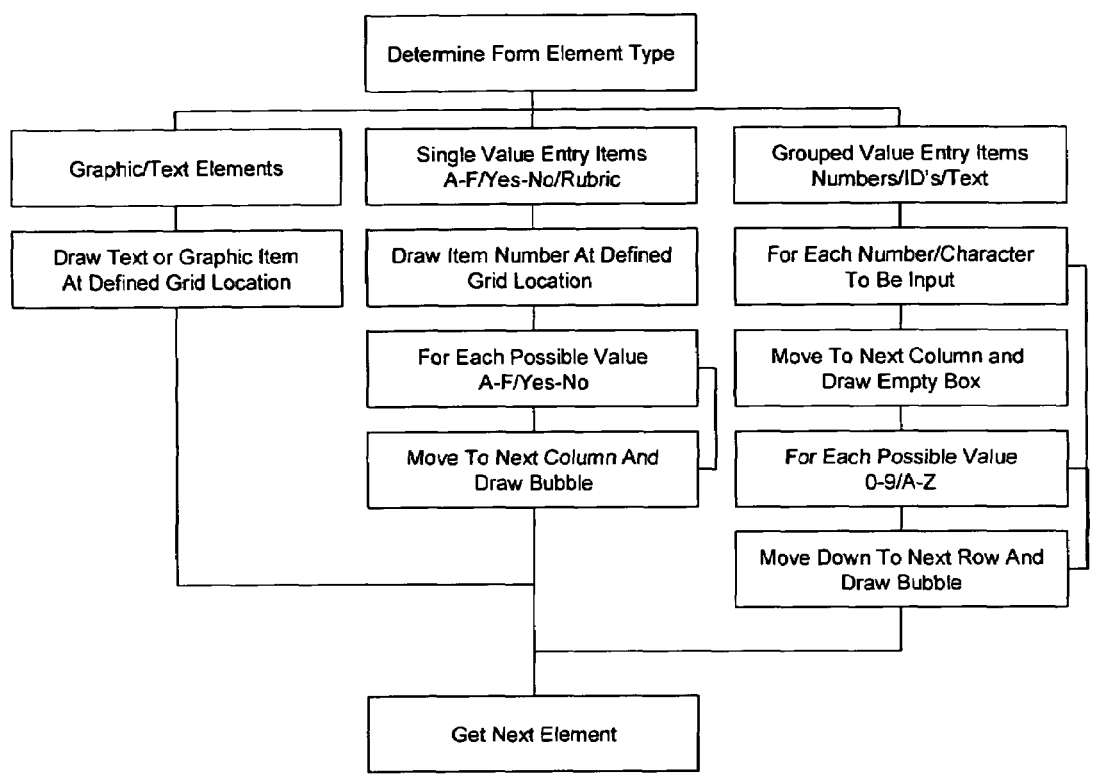
FIG.3 - Form Element Printing

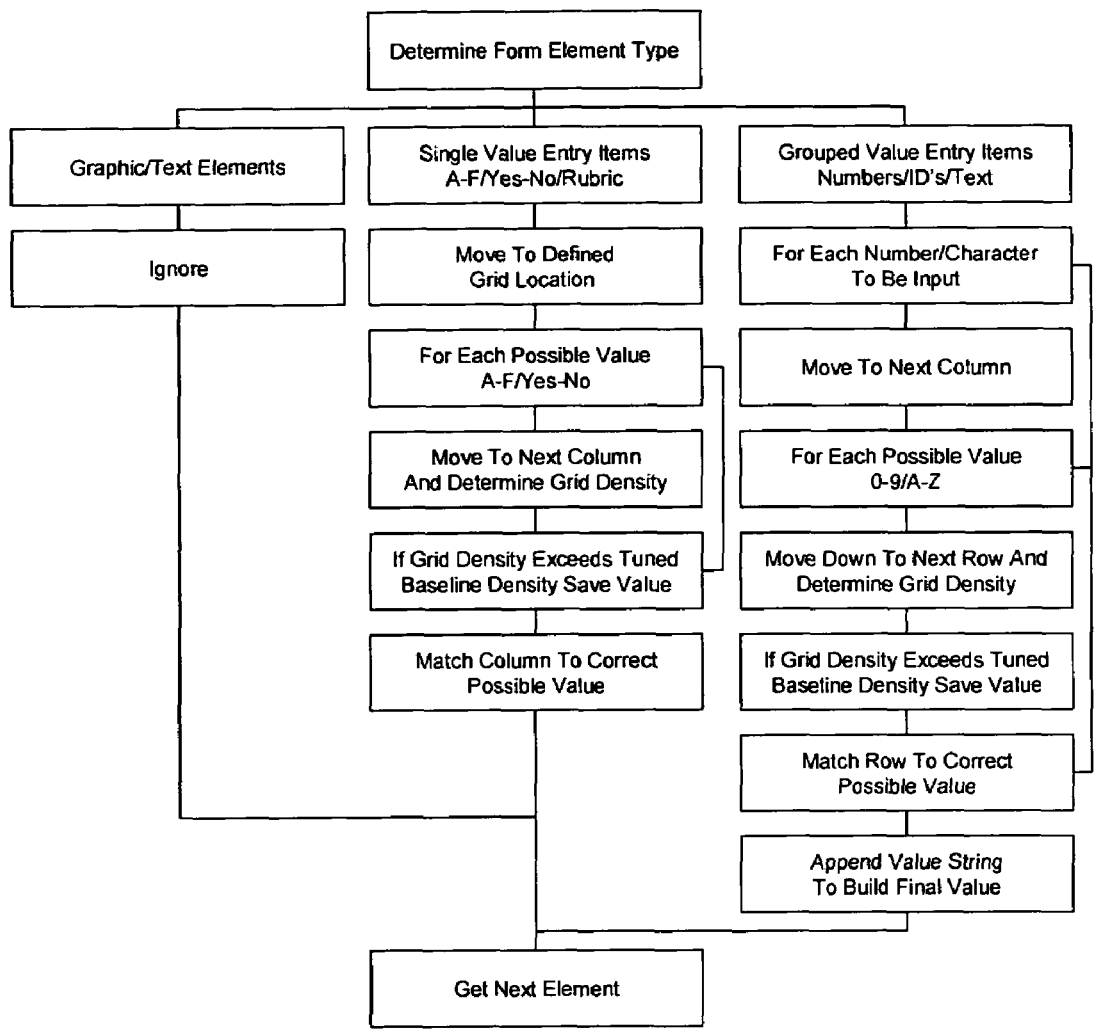
FIG.4 - Form Element Value Determination

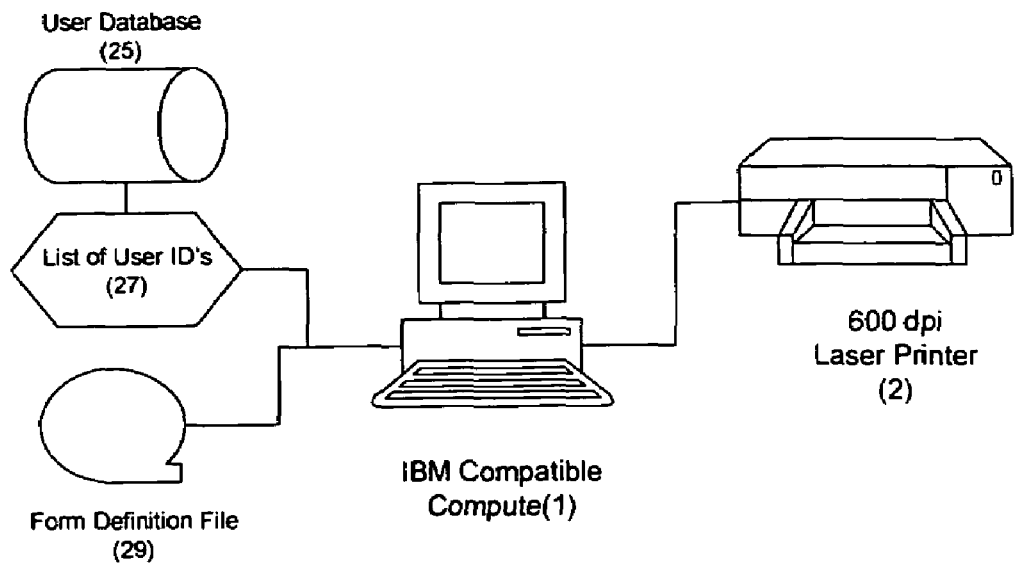
FIG.5 – Preferred Operation – Form Generation
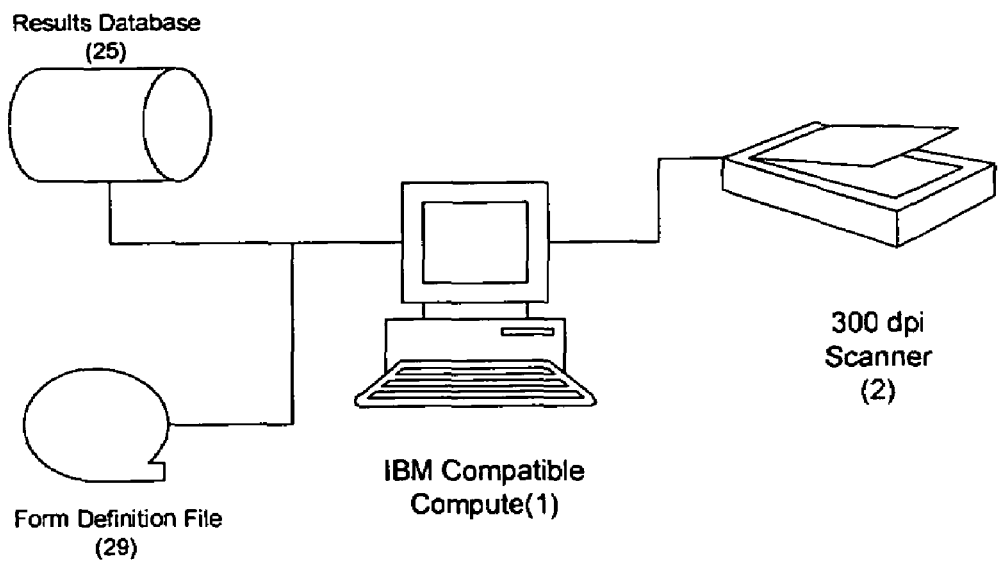
FIG.6– Preferred Operation – Form Scanning

```
Student_Name_Box,2,2,3,8
School_Name_Box,5,2,3,8
Teacher_Name_Box,8,2,3,8
Test_Name_Box,11,2,3,8
Student_ID,2,11, 9,F
School_ID,2,21,3
Line_Left,2, 2,12
Line_Bottom,13,2,7
MC4,18,2,1
MC4,19,2,2
MC4,20,2,3
MC4,21,2,4
MC4,22,2,5
MC4,23,2,6
MC4,24,2,7
MC4,18,9,8
MC4,19,9,9
MC4,20,9,10
MC4,21,9,11
MC4,22,9,12
MC4,23,9,13
MC4,24,9,14
MC4,18,16,15
MC4,19,16,16
MC4,20,16,17
MC4,21,16,18
MC4,22,16,19
MC4,23,16,20
Griddable,27,2,21,3,0
MC4,41,2,22
MC4,42,2,23
MC4,43,2,24
MC4,44,2,25
```

Figure 7

*Sample form Definition File*

Figure 8
Sample Input Sheet

RESOLUTION AND DEVICE INDEPENDENT PLAIN-PAPER INPUT SYSTEM

CROSS-REFERENCE TO RELATED APPLICATIONS

This application claims the benefit of Provisional Patent Application Ser. No. 60/622,815 filed on Oct. 28, 2004 by the present inventor.

FEDERALLY SPONSORED RESEARCH

Not Applicable

SEQUENCE LISTING OR COMPUTER PROGRAM LISTING

Incorporated by reference into this specification are two (2) compact discs, labeled "Source Listing, Copy 1 Replacement May 6, 2005" and "Source Listing, Copy 2 Replacement May 6, 2005." These discs are identical and contain one (1) file named "Source_Listing.txt" which is 239 KB in size and was created on May 6, 2005. These discs were created using Microsoft Windows XP and saved as an ASCII text file. The source code was written to conform to Microsoft Visual Basic version 6.0.

BACKGROUND OF THE INVENTION

1. Field of Invention

This invention generally relates to the capability to design and use plain paper systems for data gathering, specifically to a method whereby a individual may design a data input form, print that input form using any generally available printing device and have the results acquired through any generally available scanning device.

2. Prior Art

Previously, large volume data input into computers required the use of pre-printed and specially designed scanning sheets. These sheets, from companies such as Scantron, were designed so that a limited number of input fields were aligned in columns that were read by a specially designed scanning device. These input sheets required the use of a neutrally reflective background color for the main body of the sheet where the input was defined through the use of a number 2 pencil in specific areas of the sheet. This technology dates back many decades and most school children in the world have had the experience of taking a test using one of these input sheets. More recent efforts to replace this technology have focused on the use of optical character recognition and pattern matching to find the user input values.

The problem with the Scantron-type technologies is that pre-printed forms are required that can only be obtained from a limited number of companies. The individual users do not have the capability to create their own input forms without the time and expense of having the forms sent out for printing by the maker of whatever specific scanning device they happen to own. Additionally, since the forms created for these systems generally require offset printing, individualization of input sheets for the form user is only possible through costly and time-consuming additional steps.

The key problems with the optical character recognition and pattern matching technologies include low reliability and the input sheets being limited to a specific number and types of devices. Additionally, stray marks on the pages can easily render them unusable.

Some of the largest users of these types of data input devices are school districts and standardized testing services for recording the answers to student tests. Answers required for these types of sheets usually involve multiple choice (A-F), true/false, numeric answers and rubrics. Additional information that may be gathered include information like social security numbers, student id's, names, addresses and phone numbers.

OBJECTS AND ADVANTAGES

Accordingly, several objectives and advantages of the invention are:

a) To provide a flexible means of data gathering that easily matches the input form to the kind and type of data to be input.

b) To provide a means for allowing different types and kinds of response fields. The response bubbles may be made to any size or shape and the response fields may be spaced in any layout with increased or decreased spacing between data input items.

c) To provide a means to place instructions in text or graphic form as needed onto the input sheet.

d) To provide a means of data input that allows for the input form to be printed on any type of printing device and does not require the use of special ink colors or custom printing runs.

e) To provide a means of data input that allows multiple page forms to be easily created. Multiple forms for the same data input may also be created. Additionally, old input forms may easily be used to create new forms with minimal time and effort.

f) To provide a means where individualized data input sheets may be created by printing the input form with user information automatically filled in for the form user at the time of printing. For use in testing, this is generally referred to as slugging.

g) To provide a means where input data sheets may be printed using various colors of paper and still be machine readable.

h) To provide a means of allowing the input forms to be scanned from a wide variety of input sources, including but not limited to simple page scanners, fax machines and high-speed digital copiers. These input sources may also cover a wide range of scanning resolutions from 100 dpi to 2400 dpi and color depths from monotone black and white to 64-bit true color.

i) To provide a means where the input sensitivity of the responses may be set to a specific threshold. The input form may be set to that for the response to be properly registered, a bubble item must be filled a specific amount, such as 50%, for the response item to be properly registered.

j) To provide a means of permanently capturing the data input sheet so that the input may be reviewed electronically at a later time.

Further objects and advantages will become apparent from a consideration of the ensuing description and drawings.

SUMMARY

In accordance with the present invention a resolution and device independent plain-paper input system comprises a means to create custom data input forms, print those input forms in an individualized manner on any kind or type of printing device and have the data on those forms read through a wide variety of scanning devices.

DRAWINGS

Figures

FIG. 1 is the input sheet printing process.
FIG. 2 is the input sheet response analysis process.
FIG. 3 is the form element printing process.
FIG. 4 is the form element value determination process.
FIG. 5 is the preferred operation—form generation
FIG. 6 is the preferred operation—scanning
FIG. 7 is a sample Form Definition File
FIG. 8 is a sample generated input sheet

REFERENCE NUMERALS

Detailed Description

Preferred Embodiment—FIGS. 1-4

The claimed invention consists of five distinct parts, a computer, a printing device, a scanning device, the answer sheets generated by the printing device and a set of computer code for controlling the operation of these devices. The printing device may include, but is not limited to, any device capable of rendering black and white or color output onto an 8½ by 11, or other size, sheet of blank paper. The printing device should be capable of rendering an output resolution of at least 100 dpi. The computer can be any type of general-purpose computer capable of interfacing to the desired printing device. The scanning device can be any device capable of scanning the input sheets and saving to computer disk a tiff or machine readable graphic. The scanning device may include but is not limited to simple dedicated page scanners, fax machines and digital copiers. The scanning device may be directly connected to the computer or may be used in an off-line mode where the output files generated by the scanning device are transferred to the computer through an manual or automated process.

The operation of invention is divided into two distinct processes—generation of the input forms using the computer, computer program and printing device (Form Generation Process) and data recognition using the answer sheets generated in the first step, the computer, computer program and the output files produced by the scanning device (Form Scanning Process). Between the generation and data recognition steps a form user would fill in data onto the form by filling in bubbles or placing check marks on the answer sheet produced in the first step. FIG. 8 gives a sample input sheet generated by the system with answers marked by the user.

Form Generation Process

The printing process, FIGS. 1 and 3, begins with the construction of a Form Definition File (29). The form definition file is a text file that gives a sequential listing of each and every element to be defined on the answer sheet. FIG. 7 shows a typical form definition file used in creating a form. The form definition file may be created manually using a simple text editor or may be created using an interactive form creator. The Form Definition File may contain any number of form elements in any combination or order. Each form element in the forms definition file contains first the name of the form element and the x and y grid location of the individual form element within the form grid. Additional parameters such as, but not limited to, height, width, font size, font type or number of decimal places of the form element may be contained within the form element. The list of all of the form elements for a given form makes up an individual form definition file. These files are stored on the local computer disk in a file with the given name form_name.fdf.

As the printing process begins, the printer page is divided into two areas—printing and non-printing. The user first defines the left, right, top and bottom margins for the printing area. A box approximately 5 twips (1440 twips=1 inch on the printer) wide is drawn around the printable area of the page. No marks are allowed on the page outside of the box. The printable area of the box is then divided into any number of R rows and C columns. The only requirement for the number of rows and columns is that the resulting grid squares on the printable area need to be large enough to contain a printed object, such as a bubble, without overflowing into an adjoining grid square. Row and Column heights and widths in twips are also determined.

After the bounding box has been drawn and the number of rows and columns to be used determined, the bottom, right grid square is completely filled. This box is used to later determine if the form has been fed into the scanner upside down. Next the remainder of the bottom row of the printable area is used to encode the form number used to create the input form and the test number of the test to be taken. The form and test numbers are encoded on the bottom of the page by taking an area two rows high by the number of digits in the number and dividing it into 9 segments (3 rows by 3 columns). Filling in one of the 9 segments gives a digit 1-9 and leaving the area blank encodes a 0. So the number 249 would be encoded as:

Form numbers will generally contain from 3 to 5 digits and test numbers 5 to 9 digits. Lastly, a single digit check-sum is written on the form in the same manner as the test and form number. The check sum digit is the one's digit of the sum of the form and test numbers. The check sum digit is used to insure the proper reading of the form and test numbers when the form is scanned.

Once the form and test numbers have been encoded onto the form, the next step is to draw each individual form component onto the proper location on the form. First the proper form file is opened and each of the form elements is read and processed as they appear in the form file. Each form element has the basic structure: name, starting row, starting column and then some specific information that will vary depending on the form element. For example, a box with text in it would look like:

Box, Start Row, Start Column, Height, Width, Text Out, Font Size, Font Face

The row and column given correspond to where within the printable area the form item is to be placed. To draw this element on the form, the x and y location based on the previously determined row and column heights are calculated. In this case a box is drawn to the printer device with a height and width given on the input item and the text is drawn within the box. If the form element is one that will be used to gather information from the user, such as a check box, true/false or multiple-choice input then a series of one or more bubbles or boxes are drawn to the page depending on the number and type of available inputs the user will have. These input bubbles or boxes can be left blank for the user to fill in or may be filled (slugged) at the time of the form creation to individualize the form. Form elements line a school number or student number would normally be slugged for the user at the time of creation. Elements such as a multiple-choice input would not be filled in. This procedure is repeated for each form element in the form file.

After all of the form elements in the form file have been processed, then the form is released to the printer device to be output.

Form Scanning Process

After the printing process is complete, the form is given to the form user so that the user's information can be recorded on the form. The user provides the information by using a pen, pencil or other ink marker to fill in the bubbles or boxes corresponding to the proper information. For example, if the input form is the answer sheet for a multiple-choice exam, the user would fill in the bubble corresponding to the desired answer for the specific question. If the input to be given is numeric, the user fills in a series of bubbles corresponding to the individual digits in the number.

Once the user has completed filling in all of the information, the input form is ready to be read into machine-usable data. Using a page scanner, digital copier or other input device capable of scanning the form and transferring the information into digital form. Usable formats for the digital format include but are not limited to jpg, tiff, bmp, wmf or png formats. Any scanning resolution may be used for this process that adequately represents the scanned image from the input form. This resolution generally will not be less than 150 dpi (dots per inch). Before beginning to interpret the data on the form, the form image is first read into memory and converted to a black and white, single bit image. Here, each dot or pixel on the image is represented by a single bit. This is done for speed of processing.

The process of interpreting the input form begins with finding the location of the bounding box around the printable area. Starting at the edge of the page, the top and left sides of the bounding box are found by looking for the first non-white pixel on the image. Two points for each side are determined in order to determine the angle of the bounding box. In a properly aligned page, the left side should be perfectly vertical (90 degrees) and the top side perfectly horizontal (0 degrees). If either the left or top bounding box lines are not aligned, the image is rotated so that the bounding box sides are properly aligned. Once the bounding box sides have been properly aligned, the image of the form will be properly aligned and the location of all four sides of the bounding box may be determined. Starting at the top, bottom, left and right sides, the location of the bounding box is determined. Once the bounding box location has been determined, the printable area is determined and split into a grid of R rows and C columns in the identical fashion as in the printing process. Once the printable area grid has been determined, the form number can be read from the form. Numbers for the form and test number are read by finding which grid squares have been filled in. As in the printing process, any number is represented by a 3×3 grid corresponding to the numbers 1-9. If no grid square is filled in, the number is 0. To determine if a grid square has been filled in, a square density is determined. To determine the square density, the number of non-white pixels in the square are counted and the fraction calculated. If the calculated density exceeds a pre-determined cut-off value, the square is determined to be "filled." The density cut-off values used will vary depending on the type of input device used and the resolution of the scanning device. These numbers will typically be in the 0.2 to 0.4 range. By combining the values for each group of 3×3 grids, the form number may be assembled. Optionally, an additional numbers such as a test number may also be coded onto the form.

Once the form number has been determined, the proper form definition file may be loaded. The form definition file will give the type and location of each form element on the form. By looping through each of the individual form elements, the values for the input form elements may be determined. Each form element contains a text portion and an a series of one or more grid squares that correspond to available input values that the user may select. For example, a multiple-choice form element consists of a text value such as a question number and from 1 to 5 input grids. When the form is printed, each of the input grids will contain a circle and associated letter such as A through F. The density of each form element input grids is determined by counting the number of non-white pixels in the grid square. If the density exceeds the pre-determined cut-off value for each possible input value that input value is returned to the program. For example, if the available answers are A, B, C, D or E, each grid will have a different cut-off value depending. Additionally, these values will differ depending on the type of scanner used and the resolution of the scanner. Typical values for these cut-offs would be between 0.2 and 0.3. The system will also determine if more than one individual value has been marked in or if no value has been selected.

As the value for each of the individual form elements is determined, it is stored to a results string. This results string is then output to either a text results file or saved in a local database as individual values. The final destination of the results will depend on the environment in which the system has been implemented. If the results are to be available on the internet, the results file is uploaded to the internet to a web site such as www.myschoollife.com where the results are interpreted and reports made available. If the reporting of the results is to be done on the local machine, then the results are loaded to a local database such as Microsoft Access or Microsoft SQL Server. Reporting of the results is then done using the data stored in those databases.

Operation

Preferred Embodiment—FIGS. 5-6

The manner of using the program is broken into two stages: Form Generation and Scanning. In the Form Generation stage, the user will typically use an IBM Compatible computer attached to a 600 dpi laser printer or other printing device. This printing device may also include printer drivers that allow PDF-Type (Portable Document Format) output to computer disk.

In general operation, the user first creates a Form Definition File (29) that defines how the form is to be laid out. The form definition file can be created using a standard text processor or through a form designer that produces an ASCII file. Next, if user data is to be encoded onto the form, this data must be entered into the program data base. For example, if a test is to be given to every $4^{th}$ grader at an elementary school, the name and student ID of each student would need to be entered into the database. The input data sheets are then printed from the program using, if available, the user information from the program database.

After each user has entered data onto the input data sheets by filling in the desired bubbles, the next step in the process is to scan the input data sheet and store the information in machine usable form such as an ascii file or database. In the preferred mode of operation, a high-speed digital copy machine is used to produce a compressed graphic file in TIF format. Using the specific form definition file for this input sheet, the graphic file is analyzed as shown in FIGS. 2 and 4 and the results of each input element stored to the program database.

Alternative Embodiment

There is a large variation in the type of computer hardware used for building, printing and scanning the data input sheets. Production of the actual input sheets may be driven by a database of forms and personalized information so that a large number of different personal input sheets may be produced in a single production run. Additionally, data storage for the forms and scanned input values may reside in any number of different locations such as, but not limited to, a local personal computer, a workgroup server or the internet.

Alternative Embodiment

In alternate operational embodiments, different printing and scanning devices are used to produce the input sheets and scan the filled in input sheets. Alternate printing methods will include but are not limited to any printing device capable of generating output with a resolution greater than 100 dpi. These printing devices may produce output in black and white or color. Additionally, a printing device may be defined as any electronic machine readable display or document format such as pdf (portable document format). Alternate scanning devices may include any device capable of producing a electronic machine readable image of the input sheet. These input devices may include but are not limited to digital copiers, fax machines personal page scanners or computer screen scraping programs. The resulting image from the input device may be in, but not limited to, a compressed imaging format such as TIF, JPG, PNG, BMP or other machine readable graphic format. The only requirement is that the resulting image have individually addressable pixels.

CONCLUSION, RAMIFICATIONS, AND SCOPE

Accordingly the reader will see that, according to the invention, I have provided a highly flexible and economic method to produce customized input sheets using common computer devices. The methods also have the capability to individualize each custom answer sheet with data provided by the program user. This method also provides a means for using a wide variety of different scanning devices, with varying resolutions, to analyze the answer sheets.

While the above description contains many specifications, these should not be construed as limitations on the scope of the invention, but as exemplifications of the presently preferred embodiments thereof. Many other ramifications and variations are possible within the teachings of the of the invention. For example, the methods could easily be used to create data entry sheets for factory inventory where computer terminals are not available or used as a method of hard-copy input for voting systems.

Thus the scope of the invention should be determined by the appended claims and their legal equivalents, and not by the examples given.

I claim:

1. A method of defining, producing and analyzing device and resolution independent data input forms comprising:
    (a) A means for the user to easily define the layout of the input form in a form definition file, with the form having one or more answer selections, the total of which comprise a complete form,
    (b) Outputting of said input form to a printing device or other electronically readable form, whereby the output form is divided into user-defined horizontal and vertical grids as specified in the form definition file and whereby each individual input element is placed into said grid,
    (c) Scanning said input forms into a machine readable graphic format and analyzing said machine readable graphic by dividing the graphic into a horizontal and vertical grid as defined by the user in the form definition file, locating the individual form elements within the grid,
    (d) Automatically determining the value of each input element by calculating the filled-in density of the grid location and subtracting off a base density for each form element. The base density, for each form is automatically calculated by using unfilled answer samples contained on the individual scanned form or may be supplied by the user,
    (e) Outputting the result of each input element in machine readable form,
Whereby said input form will be used to enter data on the input form and entered into a computer for later processing.

2. The method of claim 1, wherein the generated form answer sheet contains a bounding box around all of the form items and said bounding box is used to determine the height and width of the area used for the individual answer selections as well as to properly align the scanned form before analysis can begin.

3. The method of claim 1, wherein the output result from the analysis of the input form is an ASCII file or database.

4. The system of claim 3 wherein the computer-controlled printer is a laser printer, digital copy machine or dot matrix printer.

5. The system of claim 3 wherein the computer-controlled printing device is a computer disk file in portable document format (PDF).

6. The system of claim 3 wherein the computer-controlled scanning device is a digital copy machine or other personal computer scanner or fax machine.

7. The system of claim 3 wherein the form definition file editing system is a graphic interface that allows the user to drag and drop form elements into their desired locations on a computer screen.

* * * * *